(12) United States Patent
Hillman et al.

(10) Patent No.: US 12,057,749 B2
(45) Date of Patent: Aug. 6, 2024

(54) STATOR ASSEMBLY FLUX ALIGNMENT

(71) Applicant: YASA Limited, Kidlington (GB)

(72) Inventors: Tom Hillman, Kidlington (GB); Richard Phillips, Banbury (GB); Ryan Potter, Kidlington (GB); Tim Woolmer, Waterperry (GB)

(73) Assignee: YASA Limited, Kidlington (GB)

( * ) Notice: Subject to any disclaimer, the term of this patent is extended or adjusted under 35 U.S.C. 154(b) by 0 days.

(21) Appl. No.: 17/580,796

(22) Filed: Jan. 21, 2022

(65) Prior Publication Data

US 2022/0239177 A1    Jul. 28, 2022

(30) Foreign Application Priority Data

Jan. 22, 2021  (GB) ...................... 2100872

(51) Int. Cl.
*H02K 21/24* (2006.01)
*H02K 1/14* (2006.01)
*H02K 3/42* (2006.01)

(52) U.S. Cl.
CPC ............... *H02K 3/42* (2013.01); *H02K 1/146* (2013.01); *H02K 21/24* (2013.01)

(58) Field of Classification Search
CPC .......... H02K 3/42; H02K 1/146; H02K 21/24; H02K 1/08; H02K 15/022; H02K 1/12; H02K 1/16; H02K 15/024; H02K 1/06; H02K 1/148; H02K 1/182; H02K 3/521; H02K 1/14
See application file for complete search history.

(56) References Cited

U.S. PATENT DOCUMENTS

| | | | |
|---|---|---|---|
| 5,382,853 A | 1/1995 | Von Der Heide et al. | |
| 2011/0309726 A1* | 12/2011 | Carpenter | H02K 5/203 310/75 R |
| 2013/0147291 A1* | 6/2013 | Woolmer | H02K 1/14 310/58 |

(Continued)

FOREIGN PATENT DOCUMENTS

| | | |
|---|---|---|
| EP | 2760112 A1 | 7/2014 |
| JP | H04169205 A | 6/1992 |
| JP | 2003303728 A | 10/2003 |

(Continued)

OTHER PUBLICATIONS

JP2005253275A English translation (Year: 2023).*

(Continued)

*Primary Examiner* — Christopher M Koehler
*Assistant Examiner* — Viswanathan Subramanian
(74) *Attorney, Agent, or Firm* — Meunier Carlin & Curfman LLC

(57) ABSTRACT

Various implementations include a stator assembly for an axial flux permanent magnet machine. The stator assembly may include a set of stator bars and a set of shoes for the stator bars. A shoe may be provided at one or each end of a stator bar. The stator assembly may further include a set of coils each wound around a respective stator bar. Each shoe has an inner surface adjacent to the end of one of the stator bars. The end of each stator bar has a rim, and each inner surface has a cut-away region over part of the rim to reduce a component of magnetic flux at the end of the stator bar.

10 Claims, 7 Drawing Sheets

(56) References Cited

U.S. PATENT DOCUMENTS

2015/0244219 A1* 8/2015 Woolmer ............ H02K 1/2793
310/156.32

FOREIGN PATENT DOCUMENTS

| | | | |
|---|---|---|---|
| JP | 2005253275 A | * | 9/2005 |
| JP | 2016208583 A | * | 12/2016 |
| KR | 101123676 B1 | | 3/2012 |
| WO | 02/065616 A1 | | 8/2002 |
| WO | 2020/072734 A1 | | 4/2020 |

OTHER PUBLICATIONS

JP2016208583A English translation (Year: 2023).*
UK Intellectual Property Office. Combined Search and Examination Report under Sections 17 and 18(3). Issued in GB Application No. 2100872.7 on May 4, 2021. 6 pages.

* cited by examiner

STATOR ASSEMBLY FLUX ALIGNMENT

CROSS-REFERENCE TO RELATED APPLICATIONS

This application claims priority to and benefit of GB Patent Application No. 2100872.7, filed Jan. 22, 2021, which is incorporated by reference in its entirety.

FIELD

This specification relates to stator assemblies for axial flux permanent magnetic machines with reduced power loss, and to methods of making the same.

BACKGROUND

As described herein an axial flux permanent magnet machine may be a motor or a generator. Typically such a machine typically has disc- or ring-shaped rotor and stator structures arranged about an axis. The stator comprises a set of coils each parallel to the axis and the rotor bears a set of permanent magnets and is mounted on a bearing so that it can rotate about the axis driven by fields from the stator coils.

FIG. 1a shows the general configuration of an example axial flux machine with a pair of rotors R1, R2 to either side of a stator S, although a simple structure could omit one of the rotors. There is an air gap G between the rotor(s) and stator, and in an axial flux machine the direction of flux through the air gap is substantially axial. Another configuration (not shown) extends this arrangement and has three stators and two rotors. FIG. 1b shows an example configuration with a single rotor (which may have permanent magnets on both sides), and two stators one to either side of the rotor. Other variants are possible.

There are also various configurations of axial flux permanent magnet machine possible depending, for example, upon the arrangement of north and south poles on the rotor(s). FIG. 1c illustrates the basic configurations of (from left to right) a Torus NS machine, a Torus NN machine (which has a thicker yoke because the NN pole arrangement requires flux to flow through the thickness of the yoke), a two-stator one-rotor Torus NS machine, and a YASA (Yokeless and Segmented Armature) topology. The illustration of the YASA topology shows cross-sections through two coils, the cross-hatched area showing the windings around each coil. Here, dispensing with the stator yoke provides a substantial saving in weight and iron losses but there are drawbacks. One is loss of structural strength to the stator which the iron provided, even though there is potentially increased need for strength because the YASA topology is compact and can result in very large stresses. Another is loss of a route for heat to escape from stator coils, and coolant may therefore be circulated through the machine.

In such machines there is a need to minimise excess heat generation. More particularly as can be seen from FIG. 1c, for efficient operation, that is minimum loss in the high reluctance air gap, the gap between the rotor and stator should be as small as possible. However this is a problem because it inhibits heat loss from this region. This problem can be particularly acute in the YASA topology. There is also a general need for designs with reduced losses and improved electrical efficiency. Background prior art is described in EP2760112A, JPH04169205A, JP2003/303728A, U.S. Pat. No. 5,382,853, KR101123676B, and WO2020/072734.

SUMMARY

One way to address the cooling problem is to reduce the generation of heat in the stator itself. This can be done by reducing the eddy currents in each of the stator bars, which are typically made of an electrically conducting metal such as iron, or an iron-based material or alloy or a soft magnetic composite.

In general, any flux through the stator bars will result in unwanted eddy currents within the stator bars thereby causing resistive losses. One method of reducing these eddy currents is to manufacture a laminated stator bar. A laminated stator bar is a stator bar formed from a series of stacked laminations or layers. The layered nature of the stator bar prevents eddy currents traveling perpendicularly to the plane of the laminations (i.e. parallel to the direction of stacking of the laminations). However, in a laminated stator bar eddy currents may be induced within the plane of lamination by components of flux travelling perpendicularly to the plane of lamination. Therefore, one method for reducing resistive losses in the stator is to reduce or minimise a component of the flux within the stator bars traveling parallel to the direction of stacking of the laminations.

According to a first aspect, we herein describe a stator assembly for an axial flux permanent magnet machine. The stator assembly may comprise: a set of stator bars (or equivalently teeth), and a set of shoes for the stator bars. A shoe may be provided at one or each end of a stator bar. The stator assembly may further comprise a set of coils each wound around a respective stator bar (or tooth). Each shoe has an inner surface adjacent to the end of one of the stator bars. The end of each stator bar (or tooth) has a rim, and each shoe inner surface has a cut-away region over part of the rim to reduce a component of magnetic flux at the end of the stator bar (or tooth).

The phrase "cut-away region" is not intended to imply a method for the formation of these regions, and instead merely refers to a region of the inner surface of the stator shoe from which material has been removed or otherwise restricted from (e.g. in a moulding process).

When assembled, the inner surface of the stator shoe will generally be positioned adjacent to an end of a given stator bar. As such, the "rim" of the stator bar refers generally to an edge or perimeter of the adjacent end of the stator bar.

The stator bars may be laminated stator bars. The laminations are stacked in a stacking direction, which may be perpendicular to a direction between the shoes along the stator bars e.g. perpendicular to an axis of the stator bars (or teeth). In some implementations the laminations are flat, but optionally the laminations may be curled around the axis of the stator bars (or teeth). In implementations each inner surface has a cut-away region over part of the rim to reduce the component of magnetic flux at the end of the stator bar in a direction parallel to the stacking direction.

As discussed above, in a laminated stator bar the cut-away region may reduce a component of the flux traveling parallel to the lamination stacking direction (i.e. perpendicular to the plane of the lamination layers). In some embodiments, the lamination stacking direction may be perpendicular to an axis of the stator bar. Additionally or alternatively, the lamination stacking direction may be perpendicular to the direction of separation of the stator shoes of a stator bar.

In implementations, the cut-away region may define a channel, trench or notch in the inner surface. Generally, such a channel may be approximately parallel to an edge of the inner surface. Additionally or alternatively, the channel may be shaped to approximately match the shape of the rim of the stator bar. Such channel may have a varying width and/or depth, and and/or may extend to the edge of the inner surface of the shoe.

The cut-away region may define a step change in height of the inner surface. For example, in some embodiments the cut away region may be a trench with walls approximately perpendicular to the inner surface. In some embodiments, the change in height of the cut-away region relative to the inner surface may be gradual.

In some embodiments, each inner surface of the set of shoes further comprises a second cut-away region over a second part of the rim of the stator bar. The second cut-away region may have the same dimensions as the first cut-away region or alternatively the cut-away regions may have different dimensions. For example, one cut-away region may form a channel of width 1 mm while the second cut-away region may extend to the edge of the inner surface. In one specific example, a channel may have any one or more of a width of 2 mm, a depth of 0.5 mm and may form a 1 mm overlap with the rim of the end of the stator bar.

Optionally, the cut-away regions of an inner surface may overlap with opposing parts of the rim of the stator bar. For example, a first cut-away region may be positioned at a radially innermost portion of the inner surface of the end shoe while the second cut-away region may be positioned at a radially outermost portion of the end shoe.

Generally, each stator bar will be associated with a pair of end shoes, the shoes being positioned at opposite ends of the stator bar. In some embodiments each shoe may be provided with one or more cut-away regions. The cut-away regions of the shoes may be identical or each shoe of the pair of end shoes may have a different cut-away region(s). Alternatively, in some embodiments only one shoe of each pair may have a cut-away region Therefore, the set of shoes may comprise a first set of shoes at a first end of each stator bar a second set of shoes at a second end of each of stator bars, wherein the first end and the second end are opposite ends of the stator bar.

In some embodiments, the inner surface of each shoe may extend beyond the rim of the stator bar. Alternatively, the inner surface of the end shoes may be approximately equal in shape to the adjacent end of the stator bar. Beneficially, reducing an overhang of the stator shoe may further reduce eddy currents (and therefore resistive losses) within the stator bar. However, an overhang may be used to help define cooling channels within the stator and to secure the windings around the stator bar.

In a second aspect, we herein describe a method of controlling a direction of magnetic flux in a stator assembly for an axial flux permanent magnet machine, the stator assembly comprising: a set of stator bars; a set of shoes for the stator bars, each at an end of one of the stator bars wherein each shoe has an inner surface adjacent to the end of one of the stator bars; and a set of coils each wound around a respective stator bar; the method comprising shaping the inner surface of the stator shoes to control a direction of magnetic flux exiting the ends of the stator bars.

In one embodiment, the stator bars may be laminated stator bars. The laminations may have a stacking direction, and shaping the inner surface of the stator bars to control the direction of magnetic flux exiting the ends of the stator bars may comprise shaping the inner surface of the stator bars to reduce a component of magnetic flux at the end of the stator bar in a direction parallel to the stacking direction.

By reducing a component of the flux parallel to a stacking direction, the direction of the flux exiting a stator bar may be controlled. In some embodiments, the stacking direction is perpendicular to an axis of the stator bar. Additionally or alternatively, the stacking direction may be perpendicular to a direction of separation of the shoes.

In a third aspect, we herein describe a method of making an axial flux permanent magnet machine comprising determining a shape of the inner surface of the stator shoes of the machine according to the second aspect, and making an axial flux permanent magnet machine with stator shoes of the determined shape.

BRIEF DESCRIPTION OF THE DRAWINGS

These and other aspects of the invention will now be further described, by way of example only, with reference to the accompanying figures in which:

FIGS. 2a and 2b show a schematic side view of a yokeless and segmented armature (YASA) machine, and a perspective view of the machine of FIG. 2a.

Like elements are indicated by like reference numerals.

DETAILED DESCRIPTION OF EMBODIMENTS

Figure 1A:
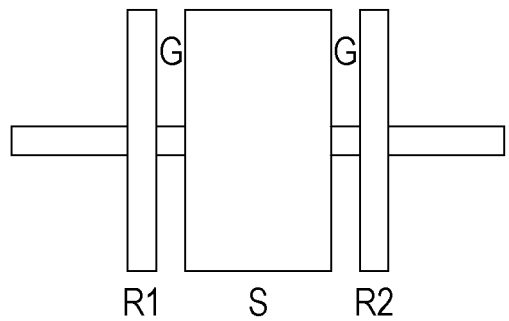
FIGS. 1a to 1c show, respectively, a general configuration of a two-rotor one-stator axial flux machine, a general configuration of a two-stator one-rotor axial flux machine, and example topologies for axial flux permanent magnet machines.
Figure 1B:
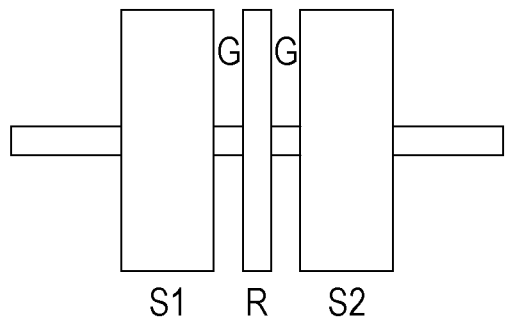
Figure 1C:
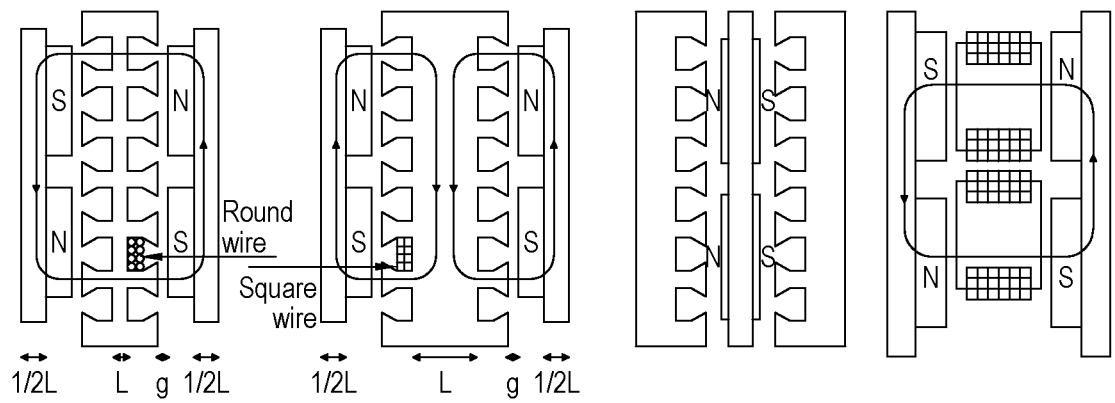
Figure 2A:
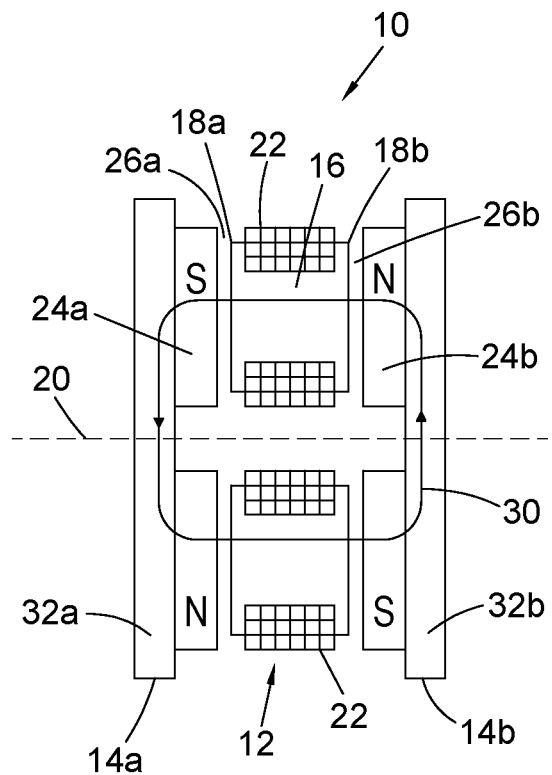
Figure 2B:
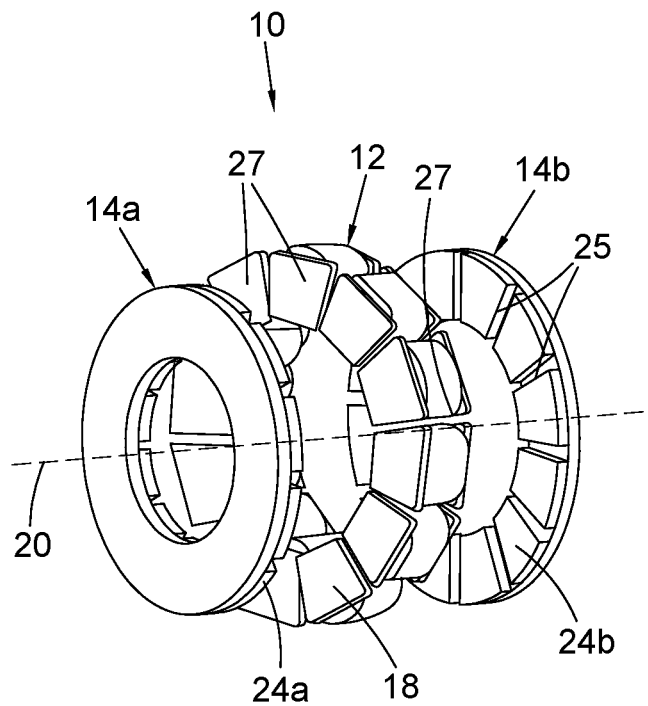

FIGS. 2a and 2b, which are taken from WO2012/022974, show schematic illustrations of an example yokeless and segmented armature (YASA) machine 10. The machine 10 may function either as a motor or as a generator.

The machine 10 comprises a stator 12 and, in this example, two rotors 14a,b. The stator 12 comprises a collection of separate stator bars 16 spaced circumferentially about a machine axis 20, which also defines an axis of the rotors 14a,b. Each bar 16 carries a stator coil 22, and has an axis which is typically disposed parallel to the rotation axis 20. Each end 18a,b of the stator bar is provided with a shoe 27, which helps to confine coils of the stator coil 22 and may also spread the magnetic field generated by the stator coil. The stator coil 22 may be formed from square or rectangular section insulated wire so that a high fill factor can be achieved. In a motor the stator coils 22 are connected to an electrical circuit (not shown) that energizes the coils so that poles of the magnetic fields generated by currents flowing in the stator coils are opposite in adjacent stator coils 22.

The two rotors 14a,b carry permanent magnets 24a,b that face one another with the stator coil 22 between. When the stator bars are inclined (not as shown) the magnets are likewise inclined. Gaps 26a,b are present between respective shoe and magnet pairs 17/24a, 27/24b; these may be air gaps or coolant-filled. In an example motor the stator coils 22 are energized so that their polarity alternates to cause coils at different times to align with different magnet pairs, resulting in torque being applied between the rotor and the stator.

The rotors 14a,b are generally connected together, for example by a shaft (not shown), and rotate together about the machine axis 20 relative to the stator 12. In the illustrated example a magnetic circuit 30 is formed by two adjacent stator bars 16, two magnet pairs 24a,b, and two back plates 32a,b, one for each rotor, linking the flux between the backs of each magnet pair 24a,b facing away from the respective coils 22. The back plates 32a,b may be referred to as back irons and comprise a magnetic material, typically a ferromagnetic material although not necessarily iron. This magnetic material is not required to be a permanent magnet. The stator coils 16 are enclosed within a housing which defines a chamber for the rotors and stator, and which may be supplied with a cooling medium.

The stator bars of a stator may be formed from laminated stacks. That is to say, each stator bar may comprise a series of layers or laminations stacked atop one another.

Figure 3:
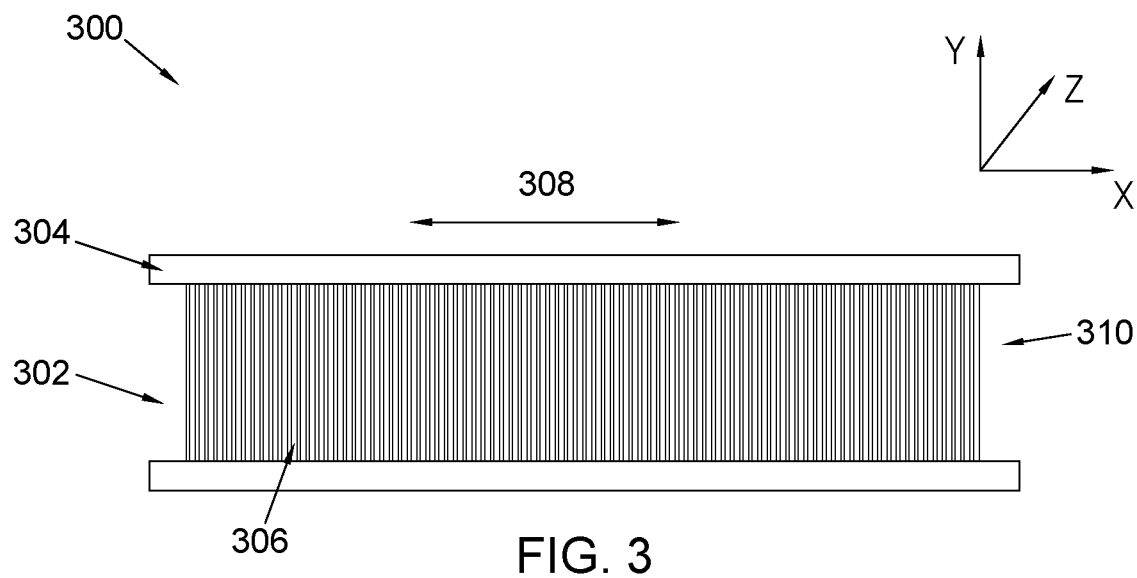
FIG. 3 shows a schematic of a laminated stator bar and stator shoes.

FIG. 3 shows a bar-shoe assembly 300 comprising such a laminated stator bar 302 and shoes 304. Stator bar 302 comprises a series of laminations 306 stacked in a horizontal lamination stacking direction 308. However, it will be understood that bar 302 may more generally be formed from laminations 306 stacked in any direction. While embodiments below are described with reference to laminations stacked perpendicularly to the separation between the end shoes and some component of an arbitrary flux travelling parallel to this stacking direction (i.e. horizontally right to left in FIG. 3), it will be understood that the described techniques may be applied more generally to laminations stacked in any direction with at least a component of flux travelling parallel to the lamination stacking direction.

The layered structure of laminated stator bars (such as stator bar 302) limit the ability of eddy currents to travel in a single direction, the direction in which the laminations are stacked (e.g. stacking direction 308). However, components of fluxes travelling parallel to the direction in which the laminations are stacked can induce eddy currents in the plane perpendicular to the direction in which laminations are stacked. As such, flux components 310 parallel to the direction in which lamination stacking direction 308 induces eddy currents in the plane of the lamination layers 306.

Figure 4:
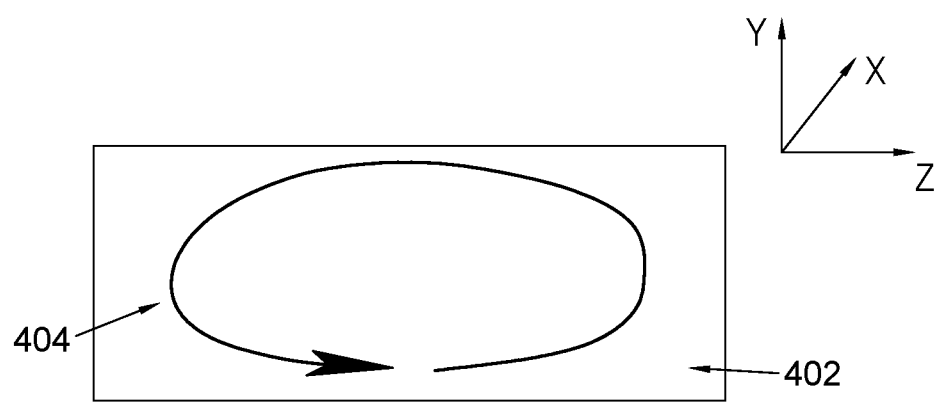
FIG. 4 shows a schematic of the laminated stator bar of FIG. 3 in the plane of lamination.

FIG. 4 shows a laminated stator bar 302 of FIG. 3 in the plane of lamination 402. Eddy currents 404 in this plane are induced by components of fluxes travelling parallel to the lamination stacking direction. The eddy currents in the plane of lamination may result in resistive losses and lower efficiencies. The square of the total flux travelling in the direction parallel to the lamination stacking direction in a bar gives an indication of the total eddy currents, j, in the same bar. For a bar laminated as shown in FIG. 3 this corresponds to the radial flux, $B_r$. Therefore:

$$\int j dV \propto \int B_r^2 dV \quad (1)$$

The resistive instantaneous power losses, P, due to the eddy currents in such a bar are therefore equal to the volume integral of the squared radial flux:

$$P = \frac{1}{\sigma} \int |j|^2 \, dV. \quad (2)$$

where σ is the conductivity of the material of the laminations and the integral is over volume elements dV. As such, it is advantageous to minimise the eddy currents 404 in the plane of lamination 502 in order to minimise resistive power losses.

Figure 5:
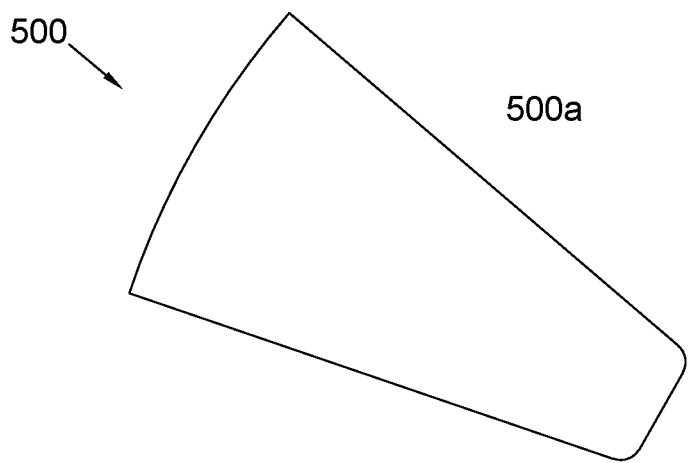
FIG. 5 shows a schematic of a prior art stator shoe.
Figure 6A:
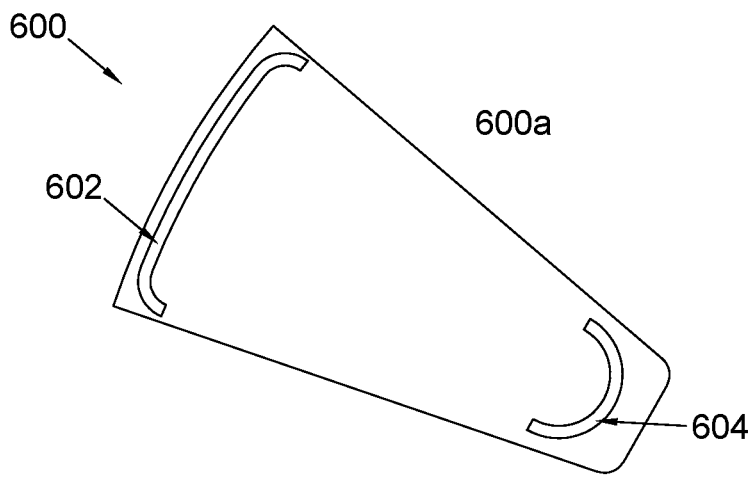
FIGS. 6a and 6b show schematic views of stator shoes according to embodiments.
Figure 6B:
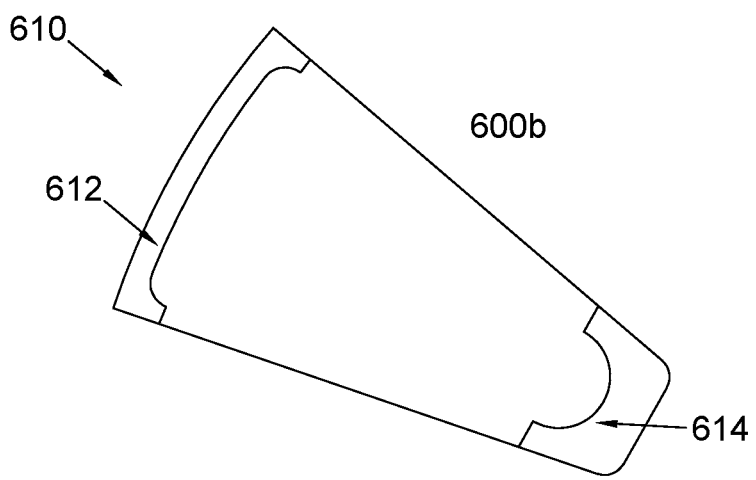

FIG. 5 shows a schematic plan view of a typical end shoe 500 for use in a bar-shoe assembly. FIGS. 6a and 6b show example shoes 600 and 610 according to embodiments. Each of FIGS. 5, 6a and 6b show an inner surface 500a, 600a, 600b or inner face of a stator shoe that, when assembled, is positioned adjacent to an end of a stator bar. Compared to shoe 500, shoes 600 and 610 include cut-away regions 602, 604, 612 and 614. It will be understood that the phrase "cut-away region" does not imply a method of construction, nor should it be construed as a limitation to a specific method of forming such cut-away regions. Instead, a cut-away region merely refers to an area of a surface of the shoe with a different height relative to the remainder of the inner surface of the shoe. For example, cut-away portions 602, 604, 612 and 614 may each comprise a channel, a notch, groove, trench, step or any other similar formation, and it will be understood that these formations may be formed by any method familiar to a person skilled in the art. It will be further understood that while cut-away portions 602, 604, 612 and 614 shown in FIGS. 6a and 6b are optimised for a stator bar laminated as shown in FIG. 3, shoes 600 and 610 and their respective cutaway regions may be shaped generally to reduce the components of fluxes for any lamination stacking direction. The precise shape and nature of the cut-away portions will vary dependent on the direction in which the laminations are stacked in the bar in order to reduce the flux components parallel to the direction in which the laminations are stacked.

Cut-away regions 602 and 604 each form a channel or notch that approximately traces the perimeter of the shoe 600. In a non-limiting example, these channels may each be approximately 2 mm wide and approximately 0.5 mm deep. More generally, each channel may be between 0.5 mm and 10 mm wide and between 0.1 mm and 2 mm deep. When assembled, the channels may fully or partially overlap with the stator bar. In another non-limiting example, each channel may have an approximately 1 mm overlap with the stator bar when assembled. More generally, the overlap between each cut-away region and the stator bar may be between 0.1 mm and the full width of the cut-away region. It will be understood that cut-away regions 602 and 604 may each have different widths, depths and/or overlaps with the stator bar, or alternatively that stator shoe 600 may include only one cut-away region.

In a further embodiment cut-away regions 612 and 614 of FIG. 6b extend to the perimeter or edge of the inner surface of the stator shoe 610. As with cut-away regions 602 and 604, when assembled into a shoe-bar assembly, cut-away portions 612 and 614 may fully or partially overlap with the stator bar. In principle in some implementations the inner surface of shoes 600 and 610 may be approximately equal in shape, and optionally area, to the adjacent end of the stator bar. For example the inner surface may have substantially no overhang (i.e. it may not extend beyond a rim of the stator bar) at the radially inner or outer edge of the shoe, or both, or neither. The inner surface may, but need not, overlap the stator bar at circumferential edges of the shoe. It will be appreciated that even though one or more edges of the shoe may align with one or more edges of the stator bar there may still be a cutaway portion as described. In some implementations the shoe may have a feature which is effectively an extension of the stator bar i.e. the cut-away portions 612 and 614 may have edges which align with an edge or rim defined by the end of the stator bar bearing the shoe.

Figure 7:
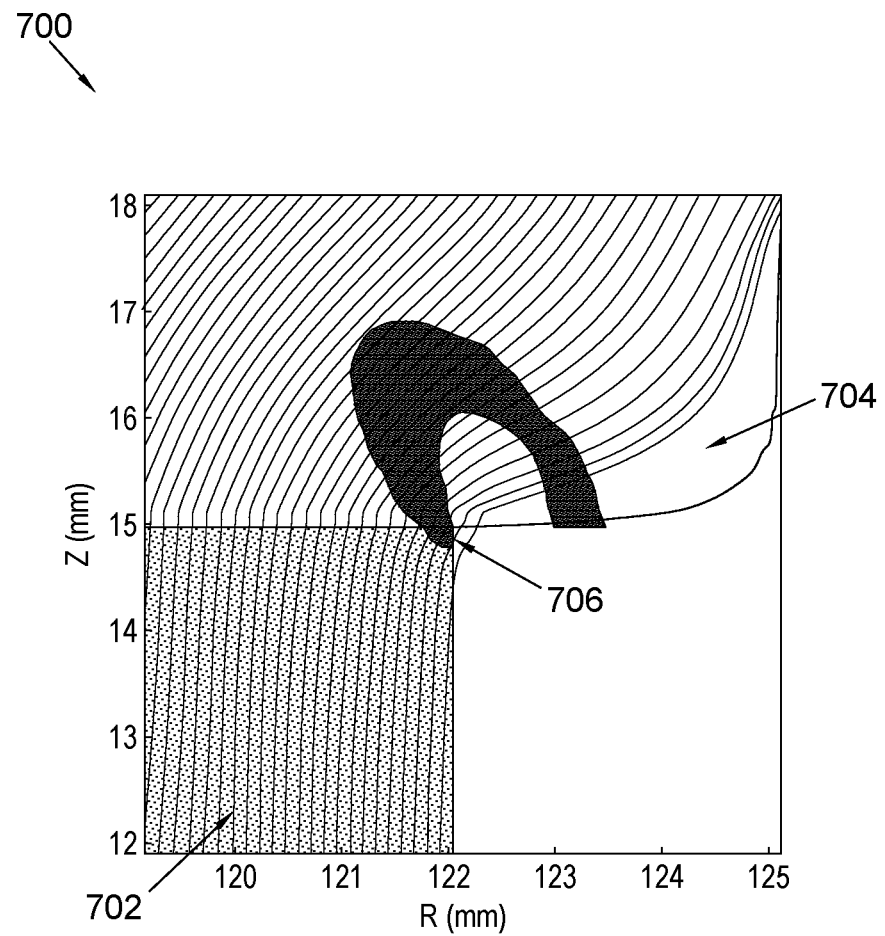
FIG. 7 is a plot showing the flux directions in the stator shoe of FIG. 5.

FIG. 7 shows a plot 700 of the direction of flux lines in a cross section of a bar-shoe assembly comprising a shoe with no cut-away region, for example bar-shoe assembly 300 of FIG. 3. The plot shows the direction of flux lines in a laminated stator bar 702 and a stator shoe 704. The Y-axis shows a height Z of the assembly (corresponding to dimension Y of FIG. 3) while the X-axis shows a width R of the assembly (corresponding to dimension X of FIG. 3), both in units of mm. In this example, the lamination stacking direction is along the X-axis (i.e. horizontally). The stippled area indicates a region of highest intensity of the flux component travelling parallel to the direction in which laminations are stacked in units of Teslas per mm$^2$ (horizontal in the figure). In general, shoe 704 has a greater intensity of flux in the stacking direction. However, as the shoe 704 is a non-laminated component the losses due to this flux component are lower relative to stator bar 702. As a result, a relatively large proportion of the resistive losses of the system result from the components of horizontal flux at point 706 of stator bar 702.

Figure 8:
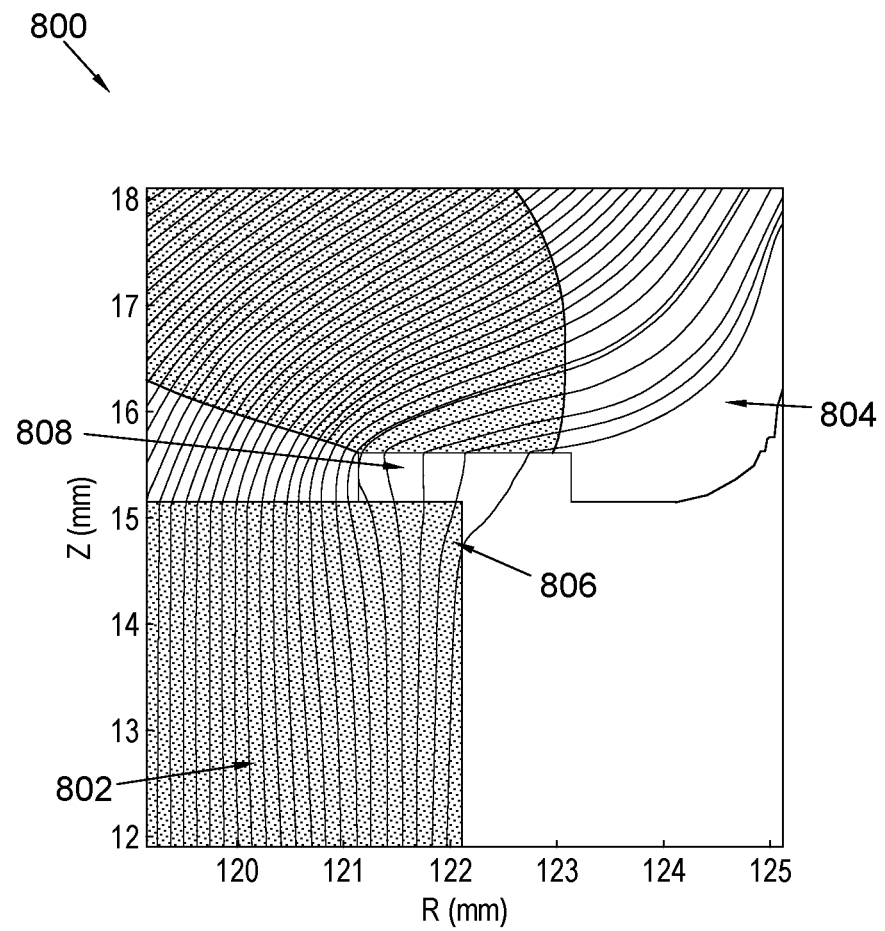
FIG. 8 is a plot showing the flux directions in the stator shoe according to an embodiment.

FIG. 8 shows a plot 800 of the direction of flux lines in a cross section of a bar-shoe assembly. The X and Y axis of FIG. 8 are the same as FIG. 7; the stippled area indicates a region of relatively higher horizontal flux component. Stator bar 802 may be, for example, the same stator bar as shown in FIG. 7. However, stator shoe 804 comprises a cut-away region 808. In this example, cut-away region 808 comprises a channel with a width (R) of 2 mm and a depth (Z) of 0.5 mm. The cut-away region 808 also comprises a 1 mm overlap with stator bar 802. As shown in FIG. 8, the intensity of the flux travelling parallel to the lamination stacking direction (i.e. the X-axis in this example) at point 806 of stator bar 802 is significantly reduced compared to point 706 of stator bar 702 shown in FIG. 7.

Utilising equation (2) above, and by comparing the integrated radial fluxes of FIGS. 7 and 8, it is possible to calculate a conservative estimate for the restive power losses shown in plots 700 and 800.

Figure 9:
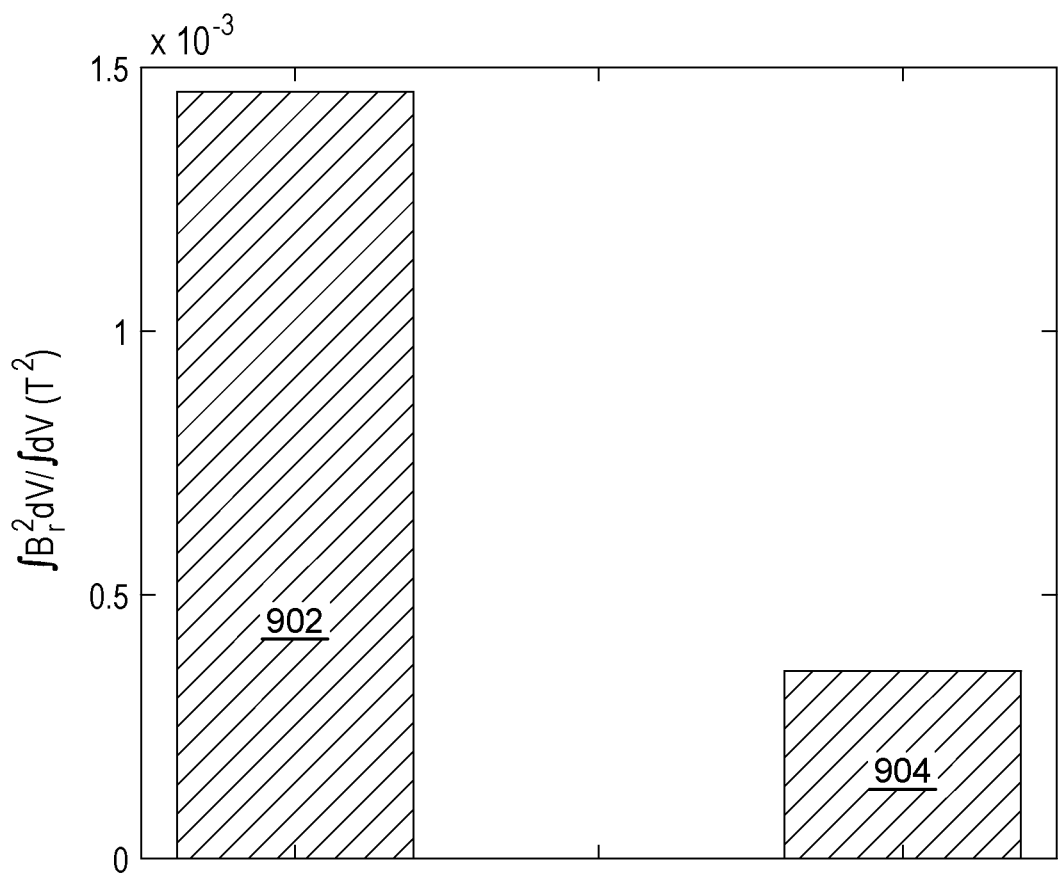
FIG. 9 shows a bar graph showing the volume integral of the squared radial flux in the stator bars an axial flux machine for various modifications to the shoe design.

FIG. 9 indicates a comparison of these losses in which the y-axis, in units of Tesla$^2$, shows a proxy for resistive power loss. Specifically, FIG. 9 shows a comparison between a proxy for the resistive losses 902 in a baseline shoe-bar assembly with no cut-away region, and a proxy for the resistive losses 904 in a shoe-bar assembly with a 2 mm wide, 0.5 mm deep cut-away region that has a 1 mm overlap with the stator bar. As can be seen in FIG. 9, shoes designed as described herein can reduce the resistive losses in a shoe bar assembly by over 75% as compared to a baseline value.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A stator assembly for an axial flux permanent magnet machine, the stator assembly comprising:
    a set of stator bars;
    a set of shoes for the stator bars, each at an end of one of the stator bars; and
    a set of coils each wound around a respective stator bar;
    wherein each shoe has an inner surface adjacent to and facing the end of one of the stator bars, the end of each stator bar having a rim, and each inner surface having a cut-away region over part of the rim of the stator bar, the cut-away region comprising a channel formed in the inner surface that provides a region of reduced thickness of the shoe, and the cut-away region reducing a horizontal component of magnetic flux at an interface between the end of the stator bar and the shoe.

2. The stator assembly of claim 1 wherein the stator bars are laminated stator bars, wherein the laminations are stacked in a stacking direction, and wherein the stacking direction is perpendicular to a direction between the shoes along the stator bars, and wherein each said inner surface has a cut-away region over part of the rim to reduce the component of magnetic flux at the end of the stator bar in a direction parallel to the stacking direction.

3. The stator assembly of claim 1, wherein the cut-away region defines a step change in height of the inner surface.

4. The stator assembly of claim 1, wherein each inner surface of the set of shoes further comprises a second cut-away region over a second part of the rim of the stator bar.

5. The stator assembly of claim 4, wherein cut-away regions overlap with opposing parts of the rim of the stator bar.

6. The stator assembly of claim 1, wherein the set of shoes comprises a first set of shoes at a first end of each stator bar a second set of shoes at a second end of each of stator bars, wherein the first end and the second end are opposite ends of the stator bar.

7. The stator assembly of claim 1, wherein the inner surface of each shoe extends beyond the rim of the stator bar.

8. The stator assembly of claim 1, wherein an overlap between the cut-away region and the stator bar is at least about 1 mm.

9. The stator assembly of claim 1, wherein the cut-away region has at least one of (i) a width of about 2 mm and (ii) a depth of about 0.5 mm.

10. The stator assembly of claim 1, wherein the cut-away region extends to an edge of the inner surface of the shoe.

* * * * *